(12) United States Patent
Feit et al.

(10) Patent No.: US 9,466,259 B2
(45) Date of Patent: Oct. 11, 2016

(54) COLOR MANAGEMENT

(71) Applicant: Honda Motor Co., Ltd., Tokyo (JP)

(72) Inventors: Steven Feit, Dublin, OH (US); Ross Miller, Hilliard, OH (US); Ric Ewing, Seattle, WA (US); iLan Epstein, Seattle, WA (US); Churu Yun, Seattle, WA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/746,995

(22) Filed: Jun. 23, 2015

(65) Prior Publication Data
US 2016/0098972 A1    Apr. 7, 2016

Related U.S. Application Data

(60) Provisional application No. 62/058,371, filed on Oct. 1, 2014.

(51) Int. Cl.
| | |
|---|---|
| *G09G 5/06* | (2006.01) |
| *G09G 5/02* | (2006.01) |
| *G06T 11/00* | (2006.01) |
| *G06T 11/60* | (2006.01) |

(52) U.S. Cl.
CPC ............ *G09G 5/026* (2013.01); *G06T 11/001* (2013.01); *G06T 11/60* (2013.01); *G09G 2340/14* (2013.01)

(58) Field of Classification Search
None
See application file for complete search history.

(56) References Cited

U.S. PATENT DOCUMENTS

| | | | |
|---|---|---|---|
| 5,109,274 A | * | 4/1992 | Washio .................... H04N 1/56 358/518 |
| 6,879,327 B1 | | 4/2005 | Mathur et al. |
| 7,042,464 B1 | | 5/2006 | Paquette |
| 7,646,392 B2 | | 1/2010 | Klassen et al. |
| 7,743,338 B2 | | 6/2010 | Madden |
| 7,809,185 B2 | | 10/2010 | Li et al. |
| 7,849,414 B2 | | 12/2010 | Kan et al. |
| 7,884,833 B2 | | 2/2011 | Klassen et al. |
| 8,060,825 B2 | | 11/2011 | Chaudhri |
| 8,089,491 B2 | | 1/2012 | Klassen et al. |
| 8,259,129 B2 | | 9/2012 | Klassen et al. |

(Continued)

FOREIGN PATENT DOCUMENTS

JP        2006350521        12/2006

*Primary Examiner* — Ashish K Thomas
(74) *Attorney, Agent, or Firm* — Rankin, Hill & Clark LLP

(57) ABSTRACT

Embodiments of techniques or systems for color management are provided herein. A graphic input may be received which includes pixels associated with color codes. Respective pixels or portions of the graphic input may be binned or indexed into color code bins. Each color code bin may be indicative or be associated with a color or color code. Sample color gradients may be assigned color codes based on counts for respective color code bins. A background or layers may be generated based on the sample color gradients. Additionally, patterns or aspects may be generated for the background or layers. In this manner, color management may be provided in the form of a dynamic, changing, or moving background which may be unique to the graphic input due to the patterns (e.g., movement patterns, shape patterns, movement speed, etc.) and sample color gradients determined based on the graphic input.

20 Claims, 7 Drawing Sheets

(56) References Cited

U.S. PATENT DOCUMENTS

| | | |
|---|---|---|
| 8,261,178 B2 | 9/2012 | Sugiyama |
| 8,271,333 B1 | 9/2012 | Grigsby et al. |
| 8,290,252 B2 | 10/2012 | Schadt et al. |
| 8,326,029 B1 | 12/2012 | Obrador |
| 8,508,547 B2 | 8/2013 | Klassen et al. |
| 8,584,028 B2 | 11/2013 | Abanami |
| 8,671,351 B2 | 3/2014 | Riggs et al. |
| 2002/0005850 A1* | 1/2002 | Osborne ............... G06T 15/005 345/424 |
| 2002/0113788 A1* | 8/2002 | Bruijns ................. G06T 15/40 345/424 |
| 2004/0201547 A1 | 10/2004 | Takayama |
| 2006/0074172 A1* | 4/2006 | Yang ..................... G02B 1/113 524/492 |
| 2006/0190712 A1* | 8/2006 | Frosztega ........... B01F 15/0404 713/1 |
| 2006/0210159 A1 | 9/2006 | Huang et al. |
| 2009/0177966 A1 | 7/2009 | Chaudhri |
| 2012/0278764 A1 | 11/2012 | Arriola et al. |
| 2013/0111373 A1 | 5/2013 | Kawanishi et al. |
| 2014/0002487 A1* | 1/2014 | Marison .................. G09G 5/14 345/629 |
| 2014/0040802 A1 | 2/2014 | Abanami |

* cited by examiner

COLOR MANAGEMENT

CROSS-REFERENCE TO RELATED APPLICATIONS

This application claims the benefit of pending U.S. Provisional Patent application Ser. No. 62/058,371 entitled COLOR MANAGEMENT and filed on Oct. 1, 2014, the entirety of which is incorporated by reference herein.

BACKGROUND

Generally, vehicles may be equipped with displays, such as center console displays, touch screen displays, or other displays. These displays may be utilized to render information for a driver, passenger, or other occupant of a vehicle. For example, a display may render the day, the time, navigation instructions, etc. As another example, a display may render information for menu navigation. Consoles, such as center consoles, within vehicles may include color displays, instrumentation, or other indicators, etc. Often a human machine interface (HMI) within a vehicle may provide a static background or no background while presenting, rendering, or displaying content, graphic elements, or the like for one or more users, occupants, passengers, drivers, or operators of a vehicle.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more techniques or systems for color management are provided herein. For example, an HMI of a vehicle or a system for color management may dynamically change a color palette associated with one or more layers of a composite image being rendered (e.g., on a display). The system or the HMI of the vehicle may change the color palette of a layer or graphic elements of a layer in a manner which facilitates animation of a background layer or a gradient layer around a graphic element, such as an album art graphic element, for example. Here, in this example, a system for color management may generate this color palette based on the three highest color codes associated with an image currently being rendered on a display. In this way, a dynamic, moving background or layer may be created which is unique to the album art or graphic element being rendered or displayed.

As an example, a color code or color code data of one or more pixels of a graphic input or one or more portions of a graphic input, such as an album art graphic element, may be analyzed. One or more of the pixels or one or more of the portions of the graphic element may be binned into one or more color code bins which correspond to a color code or color code data associated with respective pixels or portions of the graphic element. In other words, a first color code bin may represent a first color or be associated with a first set of color code data different than color code data associated with a second color code bin. As an example, the top three color code bins may be selected with respect to usage within a graphic input (e.g., an album art graphic element) for one or more sample color gradients. Effectively, in this example, the top three most prevalent colors of an album art graphic element may be utilized to generate a background or 'screen saver' type animation.

One or more layers, such as background layers or gradient layers may be generated based on one or more of the sample color gradients. This may result in a background or a layer having one or more graphic elements associated with colors from the graphic element (e.g., the album art). In other words, this background or layer may be generated to have one or more graphic elements based on one or more of the sample color gradients. A layer, such as a gradient layer, may include graphic elements which move, change shape, or change color between respective sample color gradients. When one or more layers or one or more graphic elements are arranged or overlaid, a subtle color change around a graphic element or graphic input may thus be seen.

Because one or more gradient layers may be based on one or more sample color gradients (e.g., which may be binned from the album art graphic element or other graphic input), the color of one or more of the gradient layers may match, be similar to, or closely resemble one or more colors (e.g., prevalent colors) from the album art graphic element, thereby creating a color scheme or animation which is color coordinated with the album art or graphic input. In this way, the colors that are used for sample color gradients surrounding the album art window may be generated 'on the fly' or based on the album art or other currently rendered content, for example.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
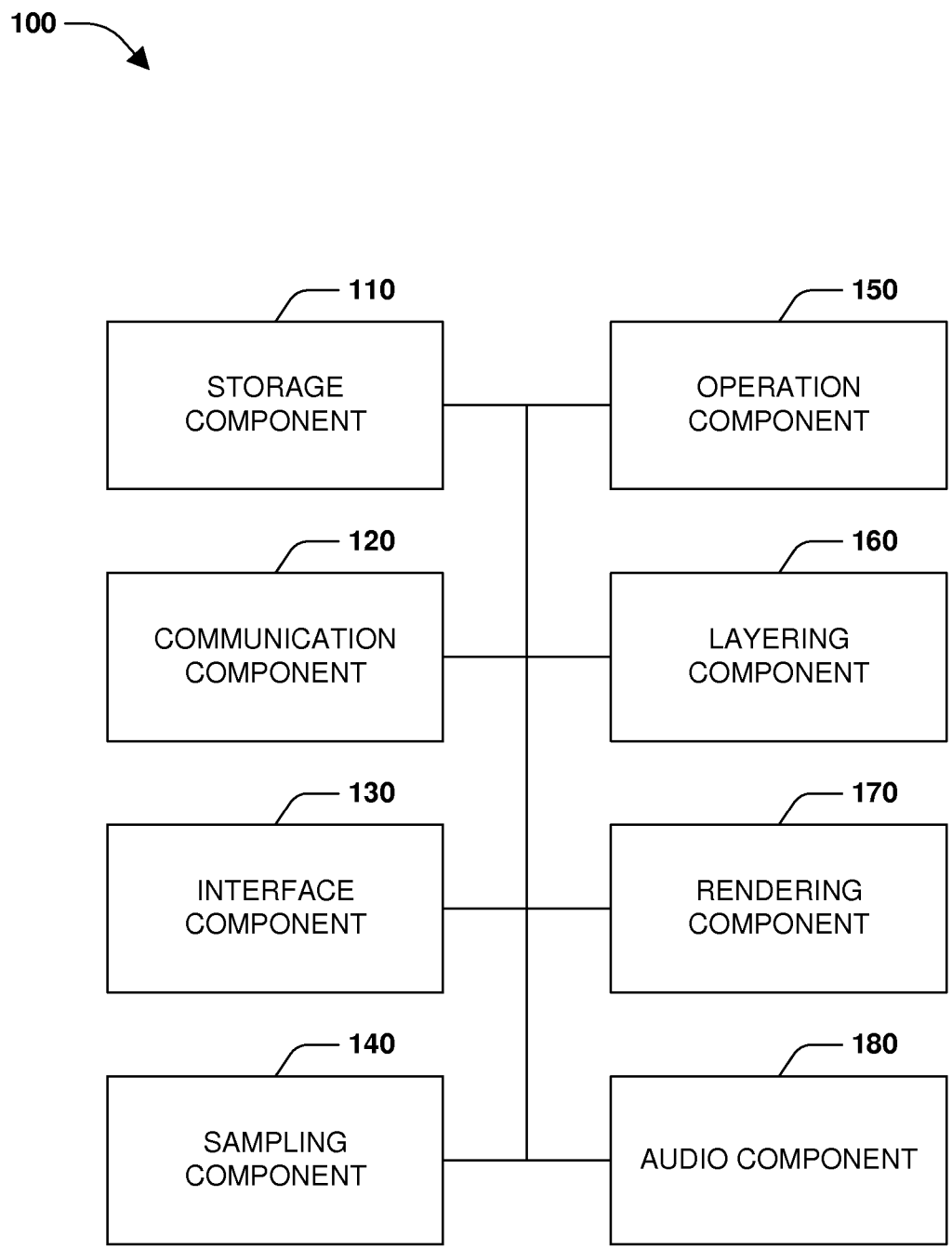
FIG. 1 is an illustration of an example component diagram of a system for color management, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 7:
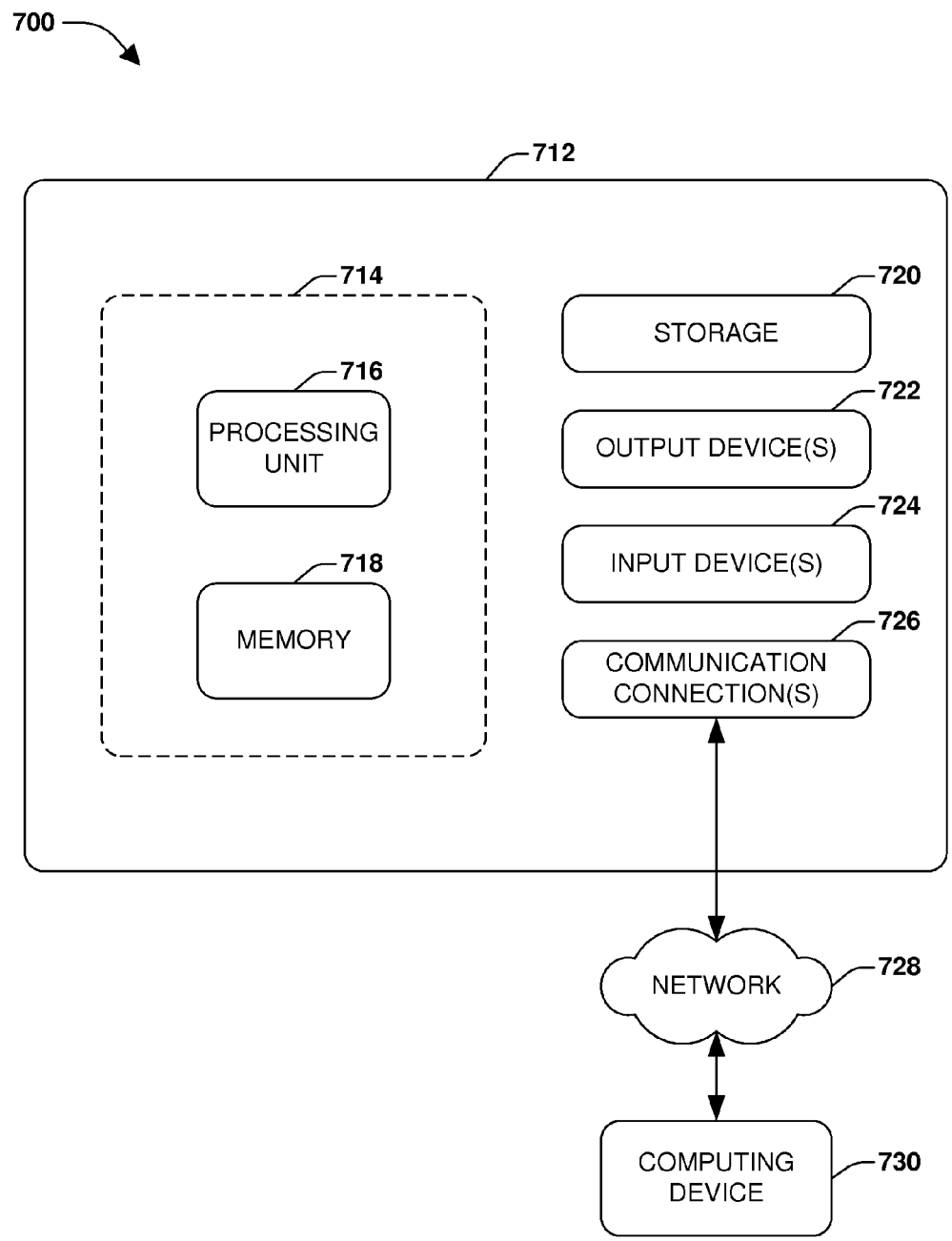
FIG. 7 is an illustration of an example computing environment where one or more of the provisions set forth herein are implemented, according to one or more embodiments.

For one or more of the figures herein, one or more boundaries, such as boundary 714 of FIG. 7, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, the term "user" may include a driver of a vehicle, an operator of a vehicle, a passenger of a vehicle, an occupant of a vehicle, an individual, an entity, etc. As used herein, the term "content item" may include shortcuts, icons, tiles, media items, functional icons, shortcut icons, items, applications, 'apps', images (e.g., which may include one or more layers or one or more graphic elements), media, animations, sound, songs, renderings, etc. Further, applications or 'apps' may be launched, executed, or run (e.g., via a processing unit or memory). As used herein, the term "rendering" may include presenting, displaying, or playback of video, audio, or other content.

As used herein, a "composite image" may include or be formed by overlaying one or more layers. A "layer" may include one or more graphic elements. Examples of layers may include a content layer, a gradient layer, a pattern layer, an art layer, a color layer, a gradient layer, a background layer, an image layer, or one or more vignette layers, such as an art vignette layer, a color vignette layer, etc. As used herein, a "background" may include or refer to a pattern (e.g., a constellation pattern). A "graphic element" may include a variety of content, including but not limited to content, album art, an album name, an artist name, an image, a contact photo or image, a graphic POI, an icon, a placeholder image, a POI logo, a profile photo or image, a song title, a time scrubber, one or more controls, an interface, or one or more portions thereof. Further, although examples or embodiments disclosed in the instant application may be described with respect to graphic elements related to album art, it will be appreciated that a graphic element is not necessarily limited to album art and may include other types of graphics. As mentioned, a graphic element may include photos, images, content, icons, graphics, data, etc. related to any number of types of content, such as content associated with social media (e.g., posts, instant messages), multimedia (e.g., music, videos, games), navigation (e.g., map data or navigation data), infotainment, etc. As used herein, a "sample color gradient" may include or refer to one or more gradients, color gradients, or colors utilized in a background or implemented within one or more graphic elements of a layer based on one or more colors, color code data, or one or more color codes associated with one or more pixels or one or more portions of a graphic element or graphic input, such as album art of a now playing album.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example component diagram of a system 100 for color management, according to one or more embodiments. The system 100 for color management may include a storage component 110, a communication component 120, an interface component 130, a sampling component 140, an operation component 150, a layering component 160, a rendering component 170, and an audio component 180.

The storage component 110 may store one or more content items, such as media, media items, music, songs, audio files (e.g., mp3 files), media files, videos, music videos, images, graphic elements (e.g., album art graphic elements), multimedia, multimedia content, one or more applications, one or more 'apps', or one or more shortcuts thereto. In one or more embodiments, a content item retrieved from the storage component 110 may be a graphic input for the system 100 for color management. In other embodiments, the graphic input may be received from other sources, such as third parties, etc. For example, a communication component 120 may maintain one or more communication channels (e.g., via telematics, wirelessly, a cellular connection) with one or more external devices or services (e.g., a mobile device, a streaming device, a server, a data store, a media store, etc.). In this way, the communication component 120 may receive one or more content items, such as music, social media updates, weather information, etc. These content items may be rendered by the rendering component 170 or the audio component 180. Further, because a content item of one or more of the content items may be selected as a graphic input, the communication component 120 may receive the graphic input, according to one or more embodiments. In one or more embodiments, a graphic input may be a graphic element currently being rendered by the rendering component 170, such as an icon graphic element, a profile image graphic element, an album art graphic element (e.g., for currently playing music), etc. The communication component 120 may include a controller area network of a vehicle.

The interface component 130 may receive one or more user inputs from one or more users, which may include passengers, drivers, occupants, operators, etc. of a vehicle. For example, the interface component 130 may receive one or more user inputs indicative of a command, a selection, a media selection, or media command (e.g., pause, play, stop, etc.). As another example, a user input may be a number or a selection indicative of a number of sample color gradients, such as a number of sample color gradients for gradient layer generation. The interface component 130 may enable a user, such as a driver or occupant, to interact with or provide input, such as user input, gestures, clicks, points, selections, etc. to a system 100 for color management. As an example, the interface component 130 may include a touch screen, a touchpad, a trackpad, one or more hardware buttons (e.g., on a radio or steering wheel), one or more buttons, such as one or more soft buttons, one or more software buttons, one or more interactive buttons, one or more switches, a keypad, a microphone, one or more sensors, or other human-machine interface (HMI), etc. In one or more embodiments, the interface component 130 may be implemented in a manner which integrates a display such that the interface component 130 both provides an output (e.g., renders content as the rendering component 170) and receives inputs (e.g., user inputs). An example of this may be a touch screen.

Regardless, the interface component 130 may receive a variety of user inputs, such as verbal commands, spoken commands (e.g., utilizing a microphone or audio sensor), pressing of buttons, activating switches, gesture inputs, such as a swipe, a multi-finger swipes, a pinch and zoom, a touch (e.g., utilizing a touch screen), a press (e.g., via pressure sensors), a press and hold, a selection, a movement of a cursor, a click (e.g., utilizing a button, mouse button, a hardware button, a soft button, a software button, track button), etc. In this way, the interface component 130 may receive one or more user inputs, such as from a user, driver, passenger, or other occupant of a vehicle.

In one or more embodiments, one or more of the buttons may be rendered (e.g., by the rendering component 170) for the interface component 130 based on input or user input, such as presence of a finger on a trackpad, etc. Different buttons may appear on, be generated for, or be rendered for the interface depending on a mode of the system. For example, a first set of buttons may be rendered while a now playing screen is rendered. As another example, a second set of buttons may be rendered during a phone call.

The sampling component 140 may determine or receive a graphic input from a rendering component 170. The graphic input may be an image currently being rendered by the rendering component 170, an image to be rendered by the rendering component 170, or an image previously rendered by the rendering component 170. The graphic input may include one or more images (e.g., composite images), one or more layers, or one or more graphic elements. As an example, the graphic input may be an album art graphic element, an album art image, or an icon graphic element. Here, in this example, the graphic input of the album art graphic element may be associated with a media content item (e.g., a song, a music video, an mp3 file, etc.). As another example, the graphic input may be a profile photo or a profile image, such as from a social media database, mobile device, data store, etc.

The sampling component 140 may bin one or more pixels or one or more portions of the graphic input based on one or more color codes associated with respective pixels or respective portions of the graphic input. In other words, one or more color code bins may be associated with one or more pixels or one or more portions of the graphic input and one or more counts may be determined for one or more of the color code bins accordingly. Explained yet another way, when a color code bin is associated with a pixel, that pixel is being rendered according to or based on a corresponding color code or color code data.

The system 100 for color management may utilize a red, green, blue (RGB) color model to express color codes, color code data, or otherwise render images, graphic elements, layers, etc. As an example, for one or more pixels, (255, 0, 0) may represent the color red, (0, 255, 0) may represent the color green, and (0, 0, 255) may represent the color blue in the RGB color model. Other color models are contemplated and may also be utilized, such as hue saturation light (HSL), hue saturation value (HSV), hue saturation brightness (HSB), hue saturation intensity (HSI), cyan magenta yellow (CMY), cyan magenta yellow key (CMYK), cyan magenta yellow black (CMYB), additive color models, subtractive color models, etc. In other words, color code data for one or more color codes may be expressed (e.g., but not limited to) in any of the color models described herein.

As an example, if a graphic input has dimensions of 100 pixels by 100 pixels, there are 10,000 pixels in the graphic input. The sampling component 140 may analyze respective pixels and determine color codes associated therewith or otherwise determine a number of pixels associated with one or more colors or color codes. Here, in this example, the sampling component 140 may determine that 5,000 of the 10,000 pixels are green, 1,000 pixels are red, another 2,500 pixels are teal, and 1,500 pixels are white, thereby categorizing or binning the pixels into one of four color code bins (e.g., green, red, teal, and white). Effectively, each bin of the four color code bins represents a different color code or may be associated with different color code data. With reference to the example described above (e.g., the 100 pixel by 100 pixel graphic input having 10,000 pixels), the 5,000 green pixels may be represented with (0, 255, 0) color code data, while the 2,500 teal pixels may be represented with (0, 128, 128) color code data. Here, in this example, the red pixels may be represented with (255, 0, 0) color code data and the white pixels may be represented with (255, 255, 255) color code data.

In one or more embodiments, the sampling component 140 may group one or more color code bins together for analysis. In other words, because a multitude of colors may exist throughout a graphic input, the sampling component 140 may consolidate color code bins or group color code bins together when colors for one or more color codes are similar, fall within a common range of shades or threshold ranges, etc. Returning to the example described above (e.g., the 100 pixel by 100 pixel graphic input having 10,000 pixels), the sampling component 140 may group the 5,000 green pixels with the 2,500 teal pixels, effectively creating three categories of color code bins, rather than four. In this way, a color code bin may be generated such that a count of two or more color code bins (e.g., the teal pixels and the green pixels) is combined.

The generated color code bin may represent a color code which is different than color codes of bins which have been combined or grouped together. For example, the sampling component 140 may determine, assign, generate, or calculate a color code or color code data for a bin or color code bin (e.g., after binning is complete, during binning, etc.) based on one or more sets of pixels or one or more portions of a graphic input binned to that color code bin. Generation of the color code bin or associated color code may result in a color code which is not necessarily a member of a set of color codes from the graphic input. Here, the sampling component 140 may average respective color codes or color code data to generate a color code bin for pixels which have been grouped together. For example, the sampling component 140 may assign the green pixels and the teal pixels to a bin indicative of a green-teal or teal-green color (e.g., which may not necessarily exist within the graphic input).

Explained yet another way, due to grouping of common or similar colors, such as a grouping which include green pixels and teal pixels, respective pixels may be binned into a color code bin which is indicative of an average or weighted average of respective pixels. As an example, the sampling component 140 may assign respective teal pixels and respective green pixels to a color code bin associated with a green-teal or a teal-green. Here, the color code of such a color code bin may be the average of the teal (e.g., 0, 128, 128) and green (e.g., 0, 255, 0), thereby resulting in color code data represented by (0, 192, 64). In this way, the sampling component 140 may bin or group respective pixels or portions of a graphic input into color code bins which may not have a direct correlation with the graphic input.

Accordingly, it can be seen that the sampling component 140 may simplify binning by grouping similar color codes. Further, this enables the sampling component 140 to compensate or account for deviations or anomalies. For example, if a graphic input is 10 pixels by 10 pixels (e.g., has 100 pixels) and the graphic input has 98 pixels, each having a different shade of green (e.g., [0, 255, 0], [1, 255, 0], [0, 255, 1], [1, 255, 1], [2, 255, 0], [0, 255, 2], [2, 255, 1], [1, 255, 2], [2, 255, 2], etc.), while 2 pixels of the 100 pixels share an identical shade of red (e.g., 255, 0, 0), it may be desirable to have the sampling component 140 determine that the prevailing color is green and not red. This may be achieved based on a color grouping threshold, as described herein.

In one or more embodiments, the sampling component 140 may group the green pixels and the teal pixels together for analysis based on the commonality of the color code data, such as in the green color code value indicated by 'G' in an (R, G, B) data point. In other words, because a threshold amount of green (e.g., greater than 100) is present for respective teal pixels, one or more of the teal pixels may be grouped with the green pixels accordingly. As another example, a color grouping threshold may cause the sampling component 140 to bin a first pixel differently (e.g., in a different color code bin) than a second pixel if the difference between color code data of the first pixel and color code data of the second pixel is greater than the color grouping threshold (e.g., 155) in any of the (R, G, B) categories. As a result, the sampling component 140 may bin a teal pixel (e.g., 0, 128, 128) in the same color code bin as a green pixel (e.g., 0, 255, 0). Here, the sampling component 140 may determine that the difference in the shade of green between the green pixel and the teal pixel is 255−128=127. Because this difference of 127 is less than the color grouping threshold of 155, the sampling component 140 may bin these two pixels in the same color code bin. Further, color grouping thresholds may be determined by the sampling component 140, determined based on user input, or during a training phase and broadcast to multiple vehicles or systems via a communication component 120 or a telematics channel, for example.

In other embodiments, weighted averages or other statistical tools may be applied to the binning or grouping process. With reference to the previous example, when the teal pixels (e.g., 0, 128, 128) are grouped or binned with the green pixels (e.g., 0, 255, 0), one third of the pixels within the group or bin are teal, and the other two thirds of the pixels within the group or bin are green. Here, the sampling component 140 may determine or weight a corresponding color code for that bin accordingly. Because respective pixels are proportioned in a ⅓-⅔ manner, the sampling component 140 may calculate color code data as follows: (0, 128*⅓+255*⅔, 128*⅓+0*⅔), thereby providing color code data of (0, 213, 43) for the combined bin having respective teal pixels and green pixels. In this way, the sampling component 140 generates a color code bin associated with a green which is less intense than pure green (e.g., 0, 255, 0), for example.

The sampling component 140 may implement one or more statistical tools, such as standard deviation, variance, correlations, etc. to facilitate analysis, grouping, binning, generation of weighted averages, bins, or other color code data. In this way, the sampling component 140 may determine a color or color code data for one or more sample color gradients based on one or more pixels or one or more portions of a graphic input. Stated another way, the sampling component 140 may assign one or more color codes to one or more sample color gradients based on one or more counts of one or more color code bins. In one or more embodiments, assigning one or more of the color codes to one or more of the sample color gradients may be based on a number of sample color gradients. In one or more embodiments, the interface component 130 may receive the number of sample color gradients as a user input. In other words, the number of sample color gradients may be user selected. Accordingly, one or more sample color gradients may be determined herein.

Further, the sampling component 140 may determine a number of pixels (e.g., a count associated with a color code bin) or a number of portions of a graphic input associated with a color code bin. Effectively, this 'count' enables a system 100 for color management to generate data which is indicative of the distribution of color from the graphic input. In other words, the sampling component 140 may assess how color is distributed across a graphic input or how frequently a color associated with a color bin is utilized within a graphic input based on one or more counts for one or more of the color code bins.

In one or more embodiments, the sampling component 140 may determine a number of sample color gradients to utilize or implement for one or more layers, such as a gradient layer or a background layer. In other words, the sampling component 140 may determine a number of sample color gradients to utilize for gradient layer generation or layer generation. The sampling component 140 may select one or more colors for one or more sample color gradients based on one or more counts of one or more color code bins and the number of sample color gradients. In other words, the sampling component 140 may determine a number of colors to incorporate into a rendering of one or more layers, a background, a composite image, etc. Further, the colors for the layers or background may be selected, determined, or generated from colors of a graphic input or graphic element, such as album art.

As an example, the system may select the top three (e.g., three sample color gradients) most utilized colors for an album art graphic element (e.g., the graphic input) and utilize the selected colors (e.g., sample color gradients) to generate a layer, such as a gradient layer or a background layer, for an HMI, an animation associated with the HMI, or renderings for the HMI. In one or more embodiments, if there is a tie among two or more sample color gradients for the most utilized colors, such as a tie for third place where the top three colors are selected, the third color may be selected randomly between the two colors which are tied. In other embodiments, the third color may be selected based on the other two colors (e.g., the top two selections or colors), such as based on contrast between the third color and the first two colors, based on a complementary color palette, etc.

In this way, the system 100 for color management may generate subtle color changes around a graphic element, such as an album art graphic element, or a portion of a composite image, such as an album art window, or other area, for example. Regardless, the sampling component 140 enables the system 100 for color management to animate subtle, dynamic, color palettes (e.g., implemented as graphic elements) as a background or as a layer within an image or interface based on colors from other images or graphic elements being rendered or displayed. In one or more embodiments, the colors or color palettes for a gradient layer or graphic elements associated therewith may be selected based on one or more prevalent colors or frequently utilized colors of a graphic element, as determined by pixel count, other portioning (e.g., indexing) of the graphic input.

The operation component 150 may manage, control, or switch the system 100 for color management between one or more operating modes or one or more modes. In other words, the operation component 150 may enable mode selection or provide mode control to a user, operator, passenger, etc. The operation component 150 may engage the system 100 for color management in one or more modes and generate one or more graphic elements, one or more layers, one or more images, a composite image, or an interface for rendering by the rendering component 170. For example, the operation component 150 may generate one or more gradient layers. A gradient layer may include one or more graphic elements associated with one or more sample color gradients. The operation component 150 may thus generate one or more interfaces for one or more corresponding modes.

In one or more embodiments, the operation component 150 may enable one or more modes or one or more operating modes, such as selection mode, introduction mode, ambient mode, transition mode, quiet mode, disabled mode, etc. In selection mode, the interface component 130 may receive one or more user inputs which enable a user to select media, content, music, or one or more songs for playback. For example, in selection mode the interface component 130 may receive user inputs indicative of a media command, such as a media selection, play, pause, stop, next track, previous track, volume control, song rating, more info, etc. Here, in this example, the rendering component 170 may render one or more controls for the media content item based on one or more of the sample color gradients. In other words, the rendering component 170 may render one or more controls to include or have the same color or similar color as the album art of currently playing media. In one or more embodiments, this rendering may be done when a user hovers a pointer (e.g., a mouse pointer, a trackball pointer, a finger over a touchscreen, etc.) over a control or an area within an interface.

In introduction mode, the operation component 150 may have the rendering component 170 fade-in or fly-in one or more graphic elements, such as album art, an album name, an artist name, a song title, the time of day, weather information, one or more controls or buttons (e.g., time scrubber control), etc. Transitions, such as fade-ins, fly-ins, or other animations will be described in greater detail herein.

In one or more embodiments, the operation component 150 may set a default mode of the system (e.g., when media is being played or when a now playing screen is being rendered) to an ambient mode. When the operation component 150 places the system 100 for color management in ambient mode, the operation component 150 may generate a moving or dynamic background or a layer unique to a scenario or graphic input based on one or more sample color gradients and a number of sample color gradients. In other words, operation component 150 may generate one or more graphic elements for one or more layers, such as a gradient layer or a background layer, to facilitate creation or rendering of an animation using one or more colors, such as by selecting colors prevalent in a graphic input (e.g., determined or selected by a sampling component 140).

With reference to the example described above (e.g., the 100 pixel by 100 pixel graphic input having 10,000 pixels, where 5,000 pixels are green, 2,500 pixels are teal, 1,000 pixels are red, and 1,500 pixels are white), the operation component 150 may generate a gradient layer (e.g., or another layer, such as a background layer) including one or more graphic elements or one or more backgrounds which are green, teal, and white, according to one or more embodiments (e.g., where the top three colors are utilized and the green pixels are not grouped or binned with the teal pixels).

As previously discussed, the sampling component 140 may receive a graphic input of an album art graphic element and bin one or more pixels or one or more portions of the graphic input based on one or more color codes associated with respective pixels or respective portions of the graphic input. As an example, the sampling component 140 may select three sample color gradients for which the operation component 150 may generate a dynamic background or a layer. Here, the sampling component 140 may determine a primary color, a secondary color, and a tertiary color for a first sample color gradient, a second sample color gradient, and a third sample color gradient, respectively. In this way, the sampling component 140 may set or determine a color palette for one or more layers of a composite image, such as a gradient layer, for example.

In other embodiments, the operation component 150 may generate a layer or a gradient layer including one or more graphic elements or one or more backgrounds which are green-teal, white, and red (e.g., in a scenario where the top three colors are utilized and the green pixels are grouped or binned with the teal pixels such that the color codes or color code data of the combined group is averaged or has a weighted average). In yet other embodiments, the operation component 150 may generate a gradient layer including one or more graphic elements or one or more backgrounds which are green, white, and red (e.g., where the top three colors are utilized and the green pixels are grouped or binned with the teal pixels based on a majority color code, by bin count such that the two colors binned into the same group).

Regardless, the operation component 150 may generate a moving, dynamic background or a layer for a graphic input, such as an album art graphic element, and have the rendering component 170 render the background or the layer while corresponding media or content is playing (e.g., when a now playing screen is being rendered), thereby providing a unique look to different albums or different pieces of album art, for example. Explained another way, when a system 100 for color management is in ambient mode, the operation component 150 may generate one or more composite images from one or more layers (e.g., gradient layer, etc.) which may be rendered to create an animation. When viewed or rendered, the animation may be perceived to be moving and include colors from the album art (e.g., sample color gradients). Further, when a media selection changes or when different album art is rendered for a different song, a different animation may be generated based on one or more pixels or colors from the different album art. This moving background or layer may be utilized for different interfaces or in different operation modes, such as for ambient mode or when a now playing screen is being rendered, for example. The operation component 150 may enable ambient mode based on a gear the vehicle is in or an amount of upcoming navigation ahead. As an example, if an upcoming navigation instruction includes a turn, the operation component 150 may disable ambient mode or one or more gradient layers to promote safe driving. Once the vehicle is travelling along a straightaway or a roadway associated with fewer navigation maneuvers (e.g., turns, changes in speed, etc.), the operation component 150 may resume or enable ambient mode.

The operation component 150 may facilitate generation or rendering of animation for the system 100 for color management. As an example, when the system 100 for color management is in ambient mode, the operation component 150 may enable animations by generating a movement pattern for one or more graphic elements within one or more layers, one or more vignette layers, or one or more layers, such as a gradient layer or a background layer. When implemented via the operation component 150, the movement pattern may provide respective layers, gradients, or graphic elements with movement behavior which facilitates animation (e.g., pulsing) of one or more layers in a dynamic manner, thereby providing a user with an interface having a unique (e.g., constantly changing) appearance. In this way, the operation component 150 may enable movement or animation of sample color gradients associated with one or more graphic elements in a unique fashion, thereby providing color management.

In one or more embodiments, the operation component 150 may adjust, control, or manage one or more aspects of the movement pattern, such as a size of a sample color gradient, a size of a graphic element associated with a sample color gradient, a shape of a sample color gradient, a shape of a graphic element associated with a sample color gradient, an intensity of a color or sample color gradient associated with a graphic element, a speed at which a graphic element associated with a sample color gradient morphs, moves, transitions, etc.

In one or more embodiments, the operation component 150 may control or adjust one or more of these aspects associated with one or more sample color gradients or graphic elements associated therewith based on a random number generator. For example, coordinates for a movement pattern may be based on a random number generator. The movement pattern may be generated based on a number of sample color gradients. For example, when more colors are present (e.g., greater than a threshold number of sample color gradients) the movement pattern may be associated with a slower movement speed or have larger graphic elements. The following is an example set of pseudo code for generating movement behavior or a movement pattern for one or more graphic elements or sample color gradients:

```
// ----------------------------------
// Pseudo code for gradient motion (generating movement behavior for
graphic elements associated with sample color gradients)
// ----------------------------------
// store static values for later calculation
this.homeX = this.x;
```

```
this.homeY = this.y;
this.maxX = 200 + (Math.random( ) * 50);
this.maxY = 200 + (Math.random( ) * 50);
// initiate motion step values for X and Y
this.deltaX = 0.01 + (Math.random( )/89);
this.deltaY = 0.01 + (Math.random( )/77);
// initiate random radian values for motion start position
this.motionX = Math.random( ) * (Math.PI * 2);
this.motionY = Math.random( ) * (Math.PI * 2);
function timedUpdate(e:Event):void {
    // update motion values (may be in radians)
    this.motionX += this.deltaX;
    this.motionY += this.deltaY;
    // use trigonometric function to generate organic motion
    this.x = this.homeX + (Math.sin(this.motionX) * this.maxX);
    this.y = this.homeY + (Math.cos(this.motionY) * this.maxY);
}
// set timer to call timedUpdate function
var myTimer:Timer = new Timer(33);
myTimer.addEventListener("timer", this.timedUpdate);
myTimer.start( );
```

In other embodiments, the operation component 150 may adjust one or more of the aspects based on one or more operation factors, such as a beat of music being played, a volume of the music, a number of songs, time elapsed, time of day, day of week, holiday, social media status, location, genre of music, ambient light, personal preferences, etc. With regard to the size of the sample color gradient, a predefined or predetermined maximum or minimum size may be provided based on a display size or one or more hardware capabilities. However, a current size of a sample color gradient may change or be adjusted by the operation component 150 based on a random number generator such that a graphic element of a gradient layer or a sample color gradient may grow or shrink within the predefined maximum or minimum sizes. Further, the color pattern of the gradient may initialize at the predetermined minimum size and change or morph from that point. Additionally, the speed at which the gradient graphic element grows, shrinks, or a determination as to when to grow or shrink may be made by the operation component 150 and be based on the random number generator or other operation factors. The operation component 150 may implement animations or transitions utilizing one or more predefined curves, such as a predetermined ease curve.

In one or more embodiments, the operation component 150 may enter a default mode upon startup or when the system 100 for color management is idle for a threshold amount of time. For example, the operating component 150 may set the default mode as ambient mode. As a result, when the now playing screen is rendered, the system may enter ambient mode and render one or more backgrounds, one or more layers, one or more graphic elements, images, etc. accordingly.

In transition mode, the operation component 150 may transition or change one or more gradient layers or graphic elements of respective gradient layers from a first set of sample color gradients to a second set of sample color gradients. As an example, the first set of sample color gradients may be associated with a first album art graphic element (e.g., a currently playing track), while the second set of sample color gradients may be associated with a second album art graphic element (e.g., a next track). During the transition mode, the operation component 150 may adjust one or more aspects of a movement pattern or one or more aspects associated with one or more gradient layers or graphic elements thereof. For example, the operation component 150 may adjust a movement pattern, a shape, a speed, etc. of one or more graphic elements of one or more of the gradient layers. The operation component 150 may place the system 100 for color management in transition mode when a first song or content item is ending playback and prior to when a second song or content item is beginning playback, for example.

The operation component 150 may enable a user to enter quiet mode, which may transition one or more layers, such as a gradient layer to fade into black, white, or grey, for example. The operation component 150 may also support a disabled mode where no animation or rendering occurs for a gradient layer or a background layer. In this way, the operation component 150 may provide a static background or static album art, for example.

Regardless, the operation component 150 may enable transitioning or animation from a first mode to a second mode by controlling one or more aspects of one or more layers or one or more graphic elements. For example, the operation component 150 may control or adjust one or more aspects associated with one or more graphic elements, one or more layers, one or more images by adjusting or controlling opacity, movement patterns, movement sequence, movement speed, morphing of shapes, fading of colors, transitions from a first sample color gradient to a second sample color gradient, frame control (e.g., frames per second), length of transition, type of animation (e.g., fly-in, fade-in, etc.), number of sample color gradients, sequencing of sample color gradients (e.g., randomly, to the beat of music), color intensity, brightness, contrast, or other aspects of a layer or a graphic element. Further, the operation component 150 may enable a user to select one or more preferences as to whether or not to display or render one or more graphic elements, such as album art, artist name, etc., how quickly to transition, frames per second for animation (e.g., 30 fps or 60 fps), intensity of animation or color, etc.

The layering component 160 may arrange one or more layers or one or more graphic elements to form or otherwise generate a composite image. For example, the layering component 160 may arrange one or more vignette layers, an album art graphic element, a pattern layer, a background layer, one or more graphic elements associated with one or more sample color gradients (e.g., a first sample color gradient, a second sample color gradient, and a third sample color gradient).

The layering component 160 may arrange or manage one or more graphic elements within a layer, one or more layers, an ordering of one or more of the layers, interaction, or interplay between respective graphic elements or respective layers. For example, some layers, such as an album art graphic element may be designated to be on top or as a top layer, while other layers, such as a gradient layer may be designated to be below the top layer (e.g., a secondary layer, a tertiary layer, etc.). The layering component 160 may thus control or adjust visibility, transparency, or other aspects associated with viewing a composite image formed when one or more layers are overlaid or rendered.

The rendering component 170 may render one or more composite images based on one or more of the gradient layers or one or more layers. The rendering component 170 may render an animation by generating one or more of composite images (e.g., in succession) based on the movement pattern associated with one or more of the graphic elements of one or more of the gradient layers or by adjusting graphic elements of one or more of the gradient layers to shift from one or more of the sample color gradients to one or more of the other sample color gradients. For example, if a first sample color gradient is red and a second sample color gradient is green, one or more portions of a graphic element may be rendered to shift from (255, 0, 0) to (0, 255, 0). Here, in this example, if the progression or transition is made in five frames, the RGB color code data for one or more pixels of the graphic element may be expressed as follows: (255, 0, 0) in the first frame, (192, 64, 0) in the second frame, (128, 128, 0) in the third frame, (64, 192, 0) in the fourth frame, and (0, 255, 0) in the fifth frame. In one or more embodiments, the operation component 150 may adjust the transition in a non-linear fashion or utilizing other functions, such as power functions, log functions, polynomials, etc. In one or more embodiments, the rendering component 170 may render one or more controls for the media content item based on one or more of the sample color gradients.

The audio component 180 may render audio associated with one or more content items or media content items (e.g., songs, music videos, mp3 files, audio files, etc.). The audio component 180 may include one or more speakers and may be communicatively coupled with a vehicle via a controller area network or the communication component 120.

Figure 2:
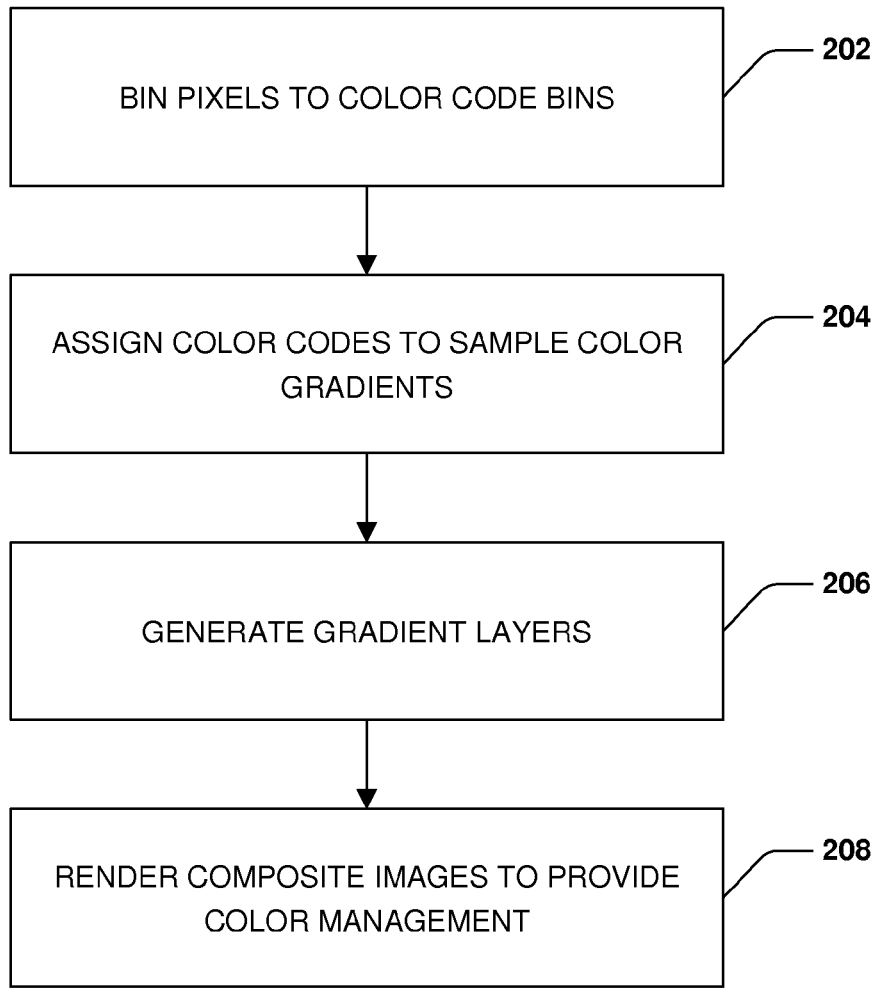
FIG. 2 is an illustration of an example flow diagram of a method for color management, according to one or more embodiments.

FIG. 2 is an illustration of an example flow diagram of a method 200 for color management, according to one or more embodiments. At 202, one or more pixels may be binned or indexed to one or more color code bins, such as based on color codes or color code data of one or more of the respective pixels. At 204, one or more color codes may be assigned to one or more sample color gradients. At 206, one or more layers or gradient layers may be generated, such as based on one or more of the sample color gradients. At 208, one or more composite images may be rendered (e.g., based on one or more layers or one or more gradient layers), thereby providing color management.

Figure 3A:
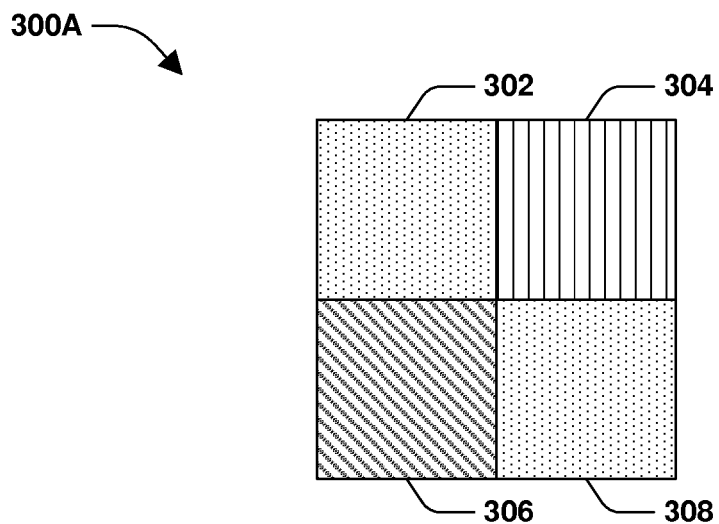
FIG. 3A is an illustration of an example graphic input, according to one or more embodiments.

FIG. 3A is an illustration of an example graphic input 300A, according to one or more embodiments. Here, in FIG. 3A, a graphic input 300A includes four pixels. Pixels 302 and 308 have a first color, pixel 304 has a second color, and pixel 306 has a third color, as indicated by the different hatching of FIG. 3A. Accordingly, it can be seen that two of the pixels 302 and 308 share the same color while the other two pixels 304 and 306 each have different colors.

Figure 3B:
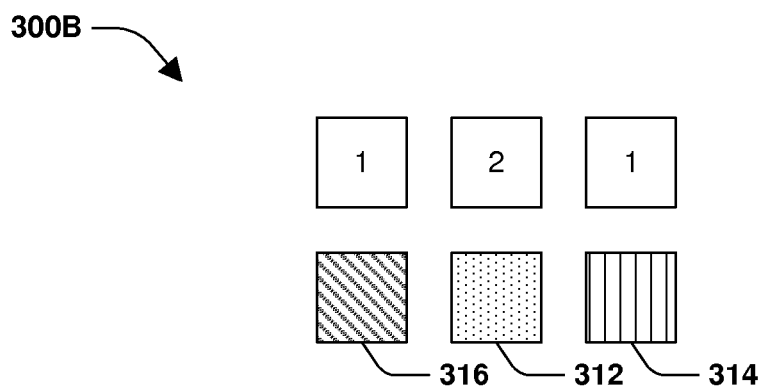
FIG. 3B is an illustration of an example binning of the example graphic input of FIG. 3A, according to one or more embodiments.

FIG. 3B is an illustration of an example binning 300B for the example graphic input of FIG. 3A, according to one or more embodiments. As discussed in FIG. 3A, there are three different color pixels within the graphic input 300A of FIG. 3A. Here, in FIG. 3B, each color may be binned to a separate bin. For example, bin 316 corresponds to the color for pixel 306, bin 312 corresponds to the color for pixels 302 and 308, and bin 314 corresponds to the color of pixel 304. In FIG. 3B, it can be seen that bin 316 has a count of one (e.g., indicative of pixel 306), bin 312 has a count of two (e.g., indicative of pixels 302 and 308), and bin 314 has a count of one (e.g., indicative of pixel 304). In this way, pixels may be binned based on color codes of respective pixels. In other embodiments, pixels may be binned or indexed in a fashion where two or more color codes are grouped.

Figure 3C:
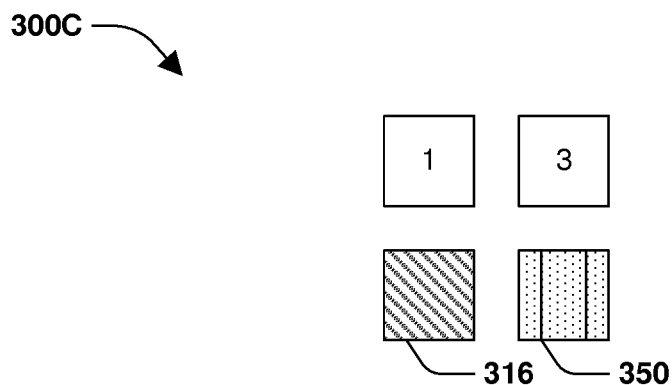
FIG. 3C is an illustration of an example binning of the example graphic input of FIG. 3A, according to one or more embodiments.

For example, FIG. 3C is an illustration of an example binning 300C of the example graphic input of FIG. 3A, according to one or more embodiments. Here, in FIG. 3C, it can be seen that there are two bins: bin 316 and bin 350. Bin 350 is a bin which groups or consolidates pixels having color codes associated with the color of pixels 302 or 308 and pixel 304 (e.g., as indicated by the combination of the hatching patterns). In one or more embodiments, bin 350 may be created due to color similarities between pixels 302 and 304, for example. Here, in FIG. 3C, bin 316 has a count of one (e.g., indicative of pixel 306) and bin 350 has a count of three (e.g., indicative of pixels 302, 304, and 308).

Figure 4:
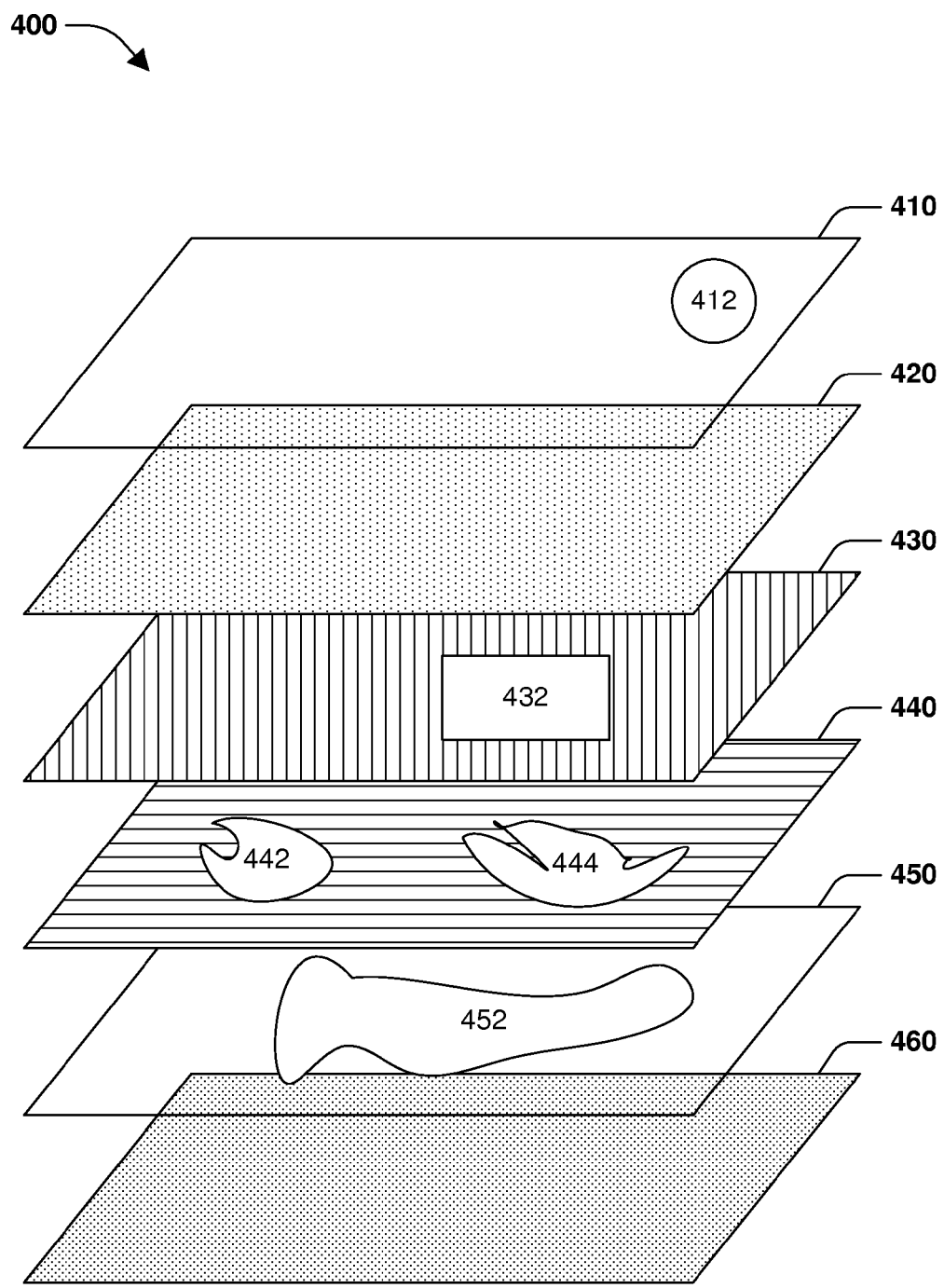
FIG. 4 is an illustration of an example image decomposed into a plurality of layers, according to one or more embodiments.

FIG. 4 is an illustration of an example image or composite image 400 decomposed into a plurality of layers, according to one or more embodiments. Described with respect to FIG. 1, the layering component 160 may arrange a composite image from one or more of the layers illustrated in FIG. 4. As an example, the image 400 of FIG. 4 may include a first layer 410, a second layer 420, a third layer 430, a fourth layer 440, a fifth layer 450, and a sixth layer 460. Here, in this example, respective layers may be arranged such that the first layer 410 appears on 'top' and the sixth layer 460 appears on the 'bottom' of the composite image, when formed. One or more of the layers (e.g., 410, 420, 430, 440, 450, or 460) may include a content layer, a pattern layer, an art layer, a color layer, a gradient layer, a background layer, etc. One or more of the layers may include one or more graphic elements. For example, the first layer 410 may include graphic element 412, which may be an album art graphic element, an icon graphic element, an image graphic element, a weather update graphic element, a social media graphic element, etc. Other layers may include other graphic elements, such as graphic elements 432 of layer 430, graphic elements 442 and 444 of layer 440, and layer 452 of layer 450. The layering component 160 may apply one or more visual effects to one or more of the layers (e.g., 410, 420, 430, 440, 450, or 460) or one or more of the graphic elements (e.g., 412, 432, 442, 444, or 452). Examples of visual effects may include transparency, opacity, movement patterns, movement speed, changing of shape, brightness, contrast, intensity, hue, etc.

Figure 5:
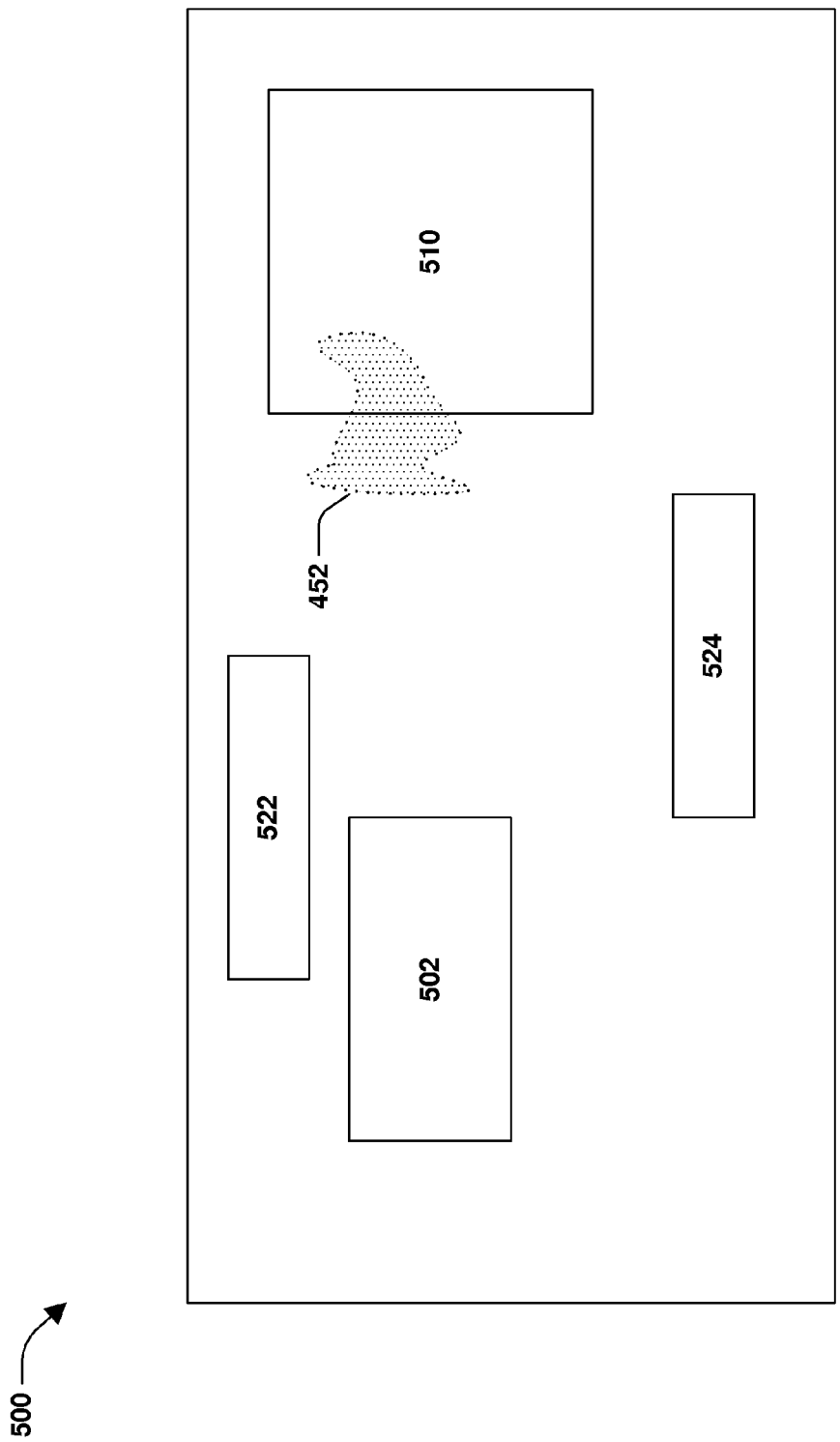
FIG. 5 is an illustration of an example interface where color management is implemented, according to one or more embodiments.

FIG. 5 is an illustration of an example interface 500 where color management is implemented, according to one or more embodiments. In one or more embodiments, the interface 500 may include a graphic input area 510, one or more controls 522 or 524, and metadata area 502. Described with respect to one or more components of FIG. 1, the operation component 150 may implement different interface renderings based on a mode or operating mode of the system 100 for color management.

In one or more embodiments, such as when the system 100 for color management is in introduction mode, the rendering component 170 may fly-in or fade-in one or more graphic elements associated with one or more layers, such as album art, an artist name, an album name, a song title, a time scrubber, or other control interface. For example, the rendering component 170 may animate a fly-in for metadata area 502 utilizing a 100 pixel increment per 10 frames, thereby creating a movement of 10 pixels per frame for one or more graphic elements. Other graphic elements may be animated at different frame rates. For example, a background layer may move or be rendered to change position at 160 pixels per 20 frames. Similarly, the rendering component 170 may fade-in one or more graphic elements (e.g., controls 522 and 524) from 0% opacity to 30% opacity in 20 frames, providing a 1.5% change in opacity per frame, for example.

When entering ambient mode, the operating component 150 may decrease a background or background layer (e.g., layer 460 of FIG. 4) in opacity. For example, the operating component 150 may adjust the opacity from 30% to 20% in 30 frames. Further, in ambient mode, the operating component 150 may determine frame rate control or a length of a transition (e.g., in frames) for an animation. As another example, a graphic element 452 of a gradient layer may fade from a default color code to a color code associated with a sample color gradient in 120 frames. Additionally, the graphic element 452 may move or change shape according to a random number generator, a movement pattern, a movement speed, or a shape shifting pattern.

In one or more embodiments, the rendering component 170 may render one or more graphic elements in response to or based on user input received by the interface component 130. For example, if the interface component 130 is a touch screen, and the user touches area 524, the operating component 150 may have the rendering component 170 highlight area 524 in response to the touch. In one or more embodiments, other areas (e.g., not touched) may be dimmed. The highlighting may be based on one or more sample color gradients or may pulse or cycle in intensity, contrast, brightness, hue, saturation, etc. The highlighting may include cycling through different color codes for respective sample color gradients. In one or more embodiments, area 524 may include one or more media controls (e.g., time scrubber, previous track, next track, shuffle, repeat, menu, etc.) and an album art graphic element may be rendered at area 510. As another example, when a user removes his or her finger from area 524, that area may be de-highlighted (e.g., if other areas were dimmed, those areas may be returned to their respective original states). Further, when no user input is received after a threshold period of time, one or more graphic elements or layers may fade such that merely a graphic element or graphic input and a gradient layer are being rendered at full opacity, for example. Different graphic elements or different layers may fade at different rates, as determined by the operation component 150.

In one or more embodiments, selection of one or more media controls or media commands may change a color scheme of an album art graphic element (e.g., rendered at 510). For example, if a track is passed over or skipped, the album art may fade to red or the opacity of the album art may be dimmed 10%. As another example, if the repeat command is received, the album art (e.g., rendered at 510) or a gradient layer may be updated to include a tint of green. In one or more embodiments, the interface component 130 may enable a user to rearrange one or more graphic elements or one or more layers based on one or more user inputs, such as a press, hold, and drag gesture, for example. When a song or track ends or finishes, an outro may be rendered such that one or more graphic elements or layers fade-out or are flown-out in reverse order of the introduction.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

Figure 6:
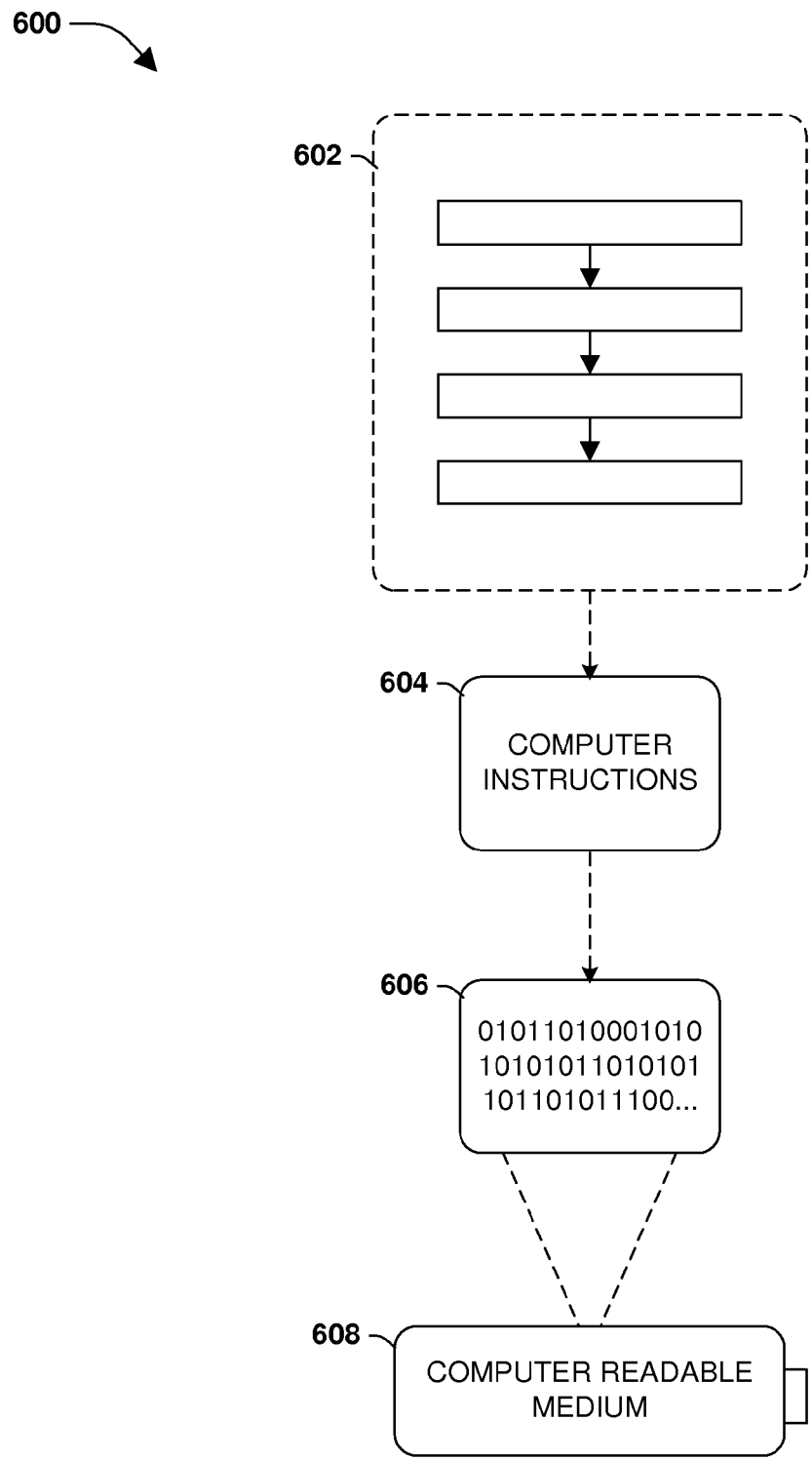
FIG. 6 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This computer-readable data 606, such as binary data including a plurality of zero's and one's as shown in 606, in turn includes a set of computer instructions 604 configured to operate according to one or more of the principles set forth herein. In one such embodiment 600, the processor-executable computer instructions 604 may be configured to perform a method 200 of FIG. 2. In another embodiment, the processor-executable instructions 604 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 7 and the following discussion provide a description of a suitable computing environment to implement embodiments of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one or more embodiments provided herein. In one configuration, computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other embodiments, device 712 includes additional features or functionality. For example, device 712 may include additional storage such as removable storage or non-removable storage, including, but not limited to, magnetic storage, optical storage, etc. Such additional storage is illustrated in FIG. 7 by storage 720. In one or more embodiments, computer readable instructions to implement one or more embodiments provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 712. Any such computer storage media is part of device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 712 includes input device(s) 724 such as keyboard, mouse, pen, voice input device, touch input device, infrared cameras, video input devices, or any other input device. Output device(s) 722 such as one or more displays, speakers, printers, or any other output device may be included with device 712. Input device(s) 724 and output device(s) 722 may be connected to device 712 via a wired connection, wireless connection, or any combination thereof. In one or more embodiments, an input device or an output device from another computing device may be used as input device(s) 724 or output device(s) 722 for computing device 712. Device 712 may include communication connection(s) 726 to facilitate communications with one or more other devices.

According to one or more aspects, a system for color management is provided, including a sampling component, an operation component, and a rendering component. The system may include a storage component, a communication component, an interface component, a layering component, and an audio component. The sampling component may bin one or more pixels of a graphic input to one or more color code bins based on one or more color codes associated with one or more of the respective pixels of the graphic input. The sampling component may assign one or more color codes to one or more sample color gradients based on one or more counts of one or more of the color code bins. The operation component may generate one or more gradient layers based on one or more of the sample color gradients. A gradient layer of one or more of the gradient layers may include one or more graphic elements associated with one or more of the sample color gradients. The rendering component may render one or more composite images based on one or more of the gradient layers. The sampling component, the operation component, or the rendering component may be implemented via a processing unit.

The storage component may store one or more content items and a content item of one or more of the content items may be the graphic input. The communication component may receive the graphic element or one or more content items. The interface component may receive one or more user inputs. One or more of the user inputs may be indicative of a media selection or a media command associated with one or more content items. The sampling component may receive the graphic input. The graphic input may be an album art image, an album art graphic element, an image, a photo, a channel graphic, a graphic element associated with navigation, or an icon graphic element. As previously discussed, a graphic element may include photos, images, content, icons, graphics, data, etc. related to any number of types of content, such as content associated with social media, multimedia, navigation, infotainment, etc. and is not necessarily limited to album art, for example. The sampling component may determine a number of sample color gradients to utilize for gradient layer generation. The operation component may generate a movement pattern for one or more of the graphic elements of one or more of the gradient layers.

The rendering component may render an animation by generating one or more of the composite images based on the movement pattern associated with one or more of the graphic elements of one or more of the gradient layers. The layering component may arrange one or more layers and one or more of the gradient layers to generate one or more of the composite images. In one or more embodiments, color code data for one or more of the color codes may be expressed based on a red, green, blue (RGB) color model, hue saturation light (HSL), hue saturation value (HSV), hue saturation brightness (HSB), hue saturation intensity (HSI), cyan magenta yellow (CMY), cyan magenta yellow key (CMYK), or cyan magenta yellow black (CMYB) color model.

According to one or more aspects, a method for color management is provided, including binning one or more pixels of a graphic input to one or more color code bins based on one or more color codes associated with one or more of the respective pixels of the graphic input, assigning one or more color codes to one or more sample color gradients based on one or more counts of one or more of the color code bins, generating one or more gradient layers based on one or more of the sample color gradients, wherein a gradient layer of one or more of the gradient layers comprises one or more graphic elements associated with one or more of the sample color gradients, and rendering one or more composite images based on one or more of the gradient layers. The binning, the assigning, the generating, or the rendering may be implemented via a processing unit.

In one or more embodiments, the method includes assigning one or more of the color codes to one or more of the sample color gradients based on a number of sample color gradients. The number of sample color gradients may be a user input. The graphic input may be an album art graphic element associated with a media content item, an image, a photo, a channel graphic, or a graphic element associated with navigation. It will be appreciated that a graphic element may include photos, images, content, icons, graphics, data, etc. related to any number of types of content, such as content associated with social media, multimedia, navigation, infotainment, etc. Although examples of graphic elements may be described with reference to album art, other types of graphic elements are contemplated, thus graphic elements are not necessarily limited to album art. The method may include rendering audio associated with the media content item. The method may include rendering one or more controls for the media content item based on one or more of the sample color gradients.

According to one or more aspects, a system for color management is provided, including a sampling component, an operation component, and a rendering component. The sampling component may bin one or more pixels of a graphic input to one or more color code bins based on one or more color codes associated with one or more of the respective pixels of the graphic input. The sampling component may assign one or more color codes to one or more sample color gradients based on one or more counts of one or more of the color code bins. The operation component may generate one or more gradient layers based on one or more of the sample color gradients, wherein a gradient layer of one or more of the gradient layers comprises one or more graphic elements associated with one or more of the sample color gradients. The operation component may generate a movement pattern for one or more of the graphic elements of one or more of the gradient layers, wherein the movement pattern may be based on a number of sample color gradients. The rendering component may render one or more composite images based on one or more of the gradient layers. The sampling component, the operation component, or the rendering component may be implemented via a processing unit.

The system may include a storage component storing one or more content items, wherein a content item of one or more of the content items may be the graphic input. The system may include a communication component receiving the graphic element or one or more content items. The system may include an interface component receiving one or more user inputs, wherein one or more of the user inputs may be indicative of a media selection or a media command associated with one or more content items.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for color management, comprising:
   a sampling component:
      binning one or more pixels of a graphic input to one or more color code bins based on one or more color codes associated with one or more of the respective pixels of the graphic input; and
      assigning one or more color codes to one or more sample color gradients based on one or more counts of one or more of the color code bins;
   an operation component generating one or more gradient layers based on one or more of the sample color gradients, wherein a gradient layer of one or more of the gradient layers comprises one or more graphic elements associated with one or more of the sample color gradients; and
   a rendering component rendering one or more composite images based on one or more of the gradient layers,
   wherein the sampling component, the operation component, or the rendering component is implemented via a processing unit.

2. The system of claim 1, comprising a storage component storing one or more content items, wherein a content item of one or more of the content items is the graphic input.

3. The system of claim 1, comprising a communication component receiving the graphic element or one or more content items.

4. The system of claim 1, comprising an interface component receiving one or more user inputs, wherein one or more of the user inputs is indicative of a media selection or a media command associated with one or more content items.

5. The system of claim 1, wherein the sampling component receives the graphic input, wherein the graphic input is an album art image, an album art graphic element, an image, a photo, a channel graphic, a graphic element associated with navigation, or an icon graphic element.

6. The system of claim 1, wherein the sampling component determines a number of sample color gradients to utilize for gradient layer generation.

7. The system of claim 1, wherein the operation component generates a movement pattern for one or more of the graphic elements of one or more of the gradient layers.

8. The system of claim 7, wherein the rendering component renders an animation by generating one or more of the composite images based on the movement pattern associated with one or more of the graphic elements of one or more of the gradient layers.

9. The system of claim 1, comprising a layering component arranging one or more layers and one or more of the gradient layers to generate one or more of the composite images.

10. The system of claim 1, wherein color code data for one or more of the color codes is expressed based on a red, green, blue (RGB) color model, hue saturation light (HSL), hue saturation value (HSV), hue saturation brightness (HSB), hue saturation intensity (HSI), cyan magenta yellow (CMY), cyan magenta yellow key (CMYK), or cyan magenta yellow black (CMYB) color model.

11. A method for color management, comprising:
   binning one or more pixels of a graphic input to one or more color code bins based on one or more color codes associated with one or more of the respective pixels of the graphic input;
   assigning one or more color codes to one or more sample color gradients based on one or more counts of one or more of the color code bins;
   generating one or more gradient layers based on one or more of the sample color gradients, wherein a gradient layer of one or more of the gradient layers comprises one or more graphic elements associated with one or more of the sample color gradients; and
   rendering one or more composite images based on one or more of the gradient layers,
   wherein the binning, the assigning, the generating, or the rendering is implemented via a processing unit.

12. The method of claim 11, wherein assigning one or more of the color codes to one or more of the sample color gradients is based on a number of sample color gradients.

13. The method of claim 12, wherein the number of sample color gradients is a user input.

14. The method of claim 11, wherein the graphic input is an album art graphic element associated with a media content item, an image, a photo, a channel graphic, or a graphic element associated with navigation.

15. The method of claim 14, comprising rendering audio associated with the media content item.

16. The method of claim 14, comprising rendering one or more controls for the media content item based on one or more of the sample color gradients.

17. A system for color management, comprising:
   a sampling component:
      binning one or more pixels of a graphic input to one or more color code bins based on one or more color codes associated with one or more of the respective pixels of the graphic input; and assigning one or more color codes to one or more sample color gradients based on one or more counts of one or more of the color code bins;

an operation component generating:
one or more gradient layers based on one or more of the sample color gradients, wherein a gradient layer of one or more of the gradient layers comprises one or more graphic elements associated with one or more of the sample color gradients; and a movement pattern for one or more of the graphic elements of one or more of the gradient layers, wherein the movement pattern is based on a number of sample color gradients; and a rendering component rendering one or more composite images based on one or more of the gradient layers, wherein the sampling component, the operation component, or the rendering component is implemented via a processing unit.

18. The system of 17, comprising a storage component storing one or more content items, wherein a content item of one or more of the content items is the graphic input.

19. The system of 17, comprising a communication component receiving the graphic element or one or more content items.

20. The system of 17, comprising an interface component receiving one or more user inputs, wherein one or more of the user inputs is indicative of a media selection or a media command associated with one or more content items.

* * * * *